(12) United States Patent
Sakai et al.

(10) Patent No.: US 7,206,269 B2
(45) Date of Patent: Apr. 17, 2007

(54) OPTICAL DISK RECORDING/REPRODUCING APPARATUS WITH REDUCED RESUME TIME

(75) Inventors: Hiroharu Sakai, Tokyo (JP); Kazuhiko Ono, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 615 days.

(21) Appl. No.: 10/626,124

(22) Filed: Jul. 23, 2003

(65) Prior Publication Data

US 2004/0141435 A1    Jul. 22, 2004

(30) Foreign Application Priority Data

Jan. 20, 2003    (JP)    ............... 2003-010674

(51) Int. Cl.
*G11B 7/00*    (2006.01)
(52) U.S. Cl. .................................. 369/47.4; 369/53.15
(58) Field of Classification Search ............ 369/47.41, 369/47.3, 47.44, 47.4, 53.15
See application file for complete search history.

(56) References Cited

U.S. PATENT DOCUMENTS

| | | | | |
|---|---|---|---|---|
| 5,027,338 A * | 6/1991 | Ata | ............ | 369/44.29 |
| 6,594,213 B1 * | 7/2003 | Hayashi | ............ | 369/47.34 |
| 6,801,489 B2 * | 10/2004 | Abe et al. | ............ | 369/47.33 |
| 2002/0021637 A1 * | 2/2002 | Iida et al. | ............ | 369/47.39 |
| 2004/0017745 A1 * | 1/2004 | Wang et al. | ............ | 369/47.35 |
| 2004/0066722 A1 * | 4/2004 | Masuda et al. | ............ | 369/47.44 |
| 2005/0068874 A1 * | 3/2005 | Heemskerk et al. | ..... | 369/59.23 |

FOREIGN PATENT DOCUMENTS

JP    2002-222561    8/2002

* cited by examiner

*Primary Examiner*—Gautam R. Patel
(74) *Attorney, Agent, or Firm*—Townsend and Townsend and Crew LLP (57) ABSTRACT

The present invention shortens a time to be elapsed from a recording interruption to a recording restart, thereby realizing a reliable recording restart. In one embodiment, an optical disk apparatus comprises an optical pickup and a processor, which includes a reproduction system circuit, a speed information detection circuit, and a position detection circuit. The reproduction system circuit is configured to generate a reproduction signal used in restarting recording of the optical disk after an interruption, based on the electrical signal from the optical pickup and setting values. The speed information detection circuit is configured to detect speed information before or after an interruption of a recording on the optical disk based on the electrical signal from the optical pickup. The position detection unit is configured to detect a recording restart position and a current position of the optical disk. An accessing unit is configured to control the optical pickup to access the optical disk at the recording restart position from the current position of the optical disk. A setting unit is configured to set in the reproduction system circuit setting values based on the detected speed information. The setting values are used by the reproduction system circuit to generate the reproduction signal.

13 Claims, 5 Drawing Sheets

OPTICAL DISK RECORDING/REPRODUCING APPARATUS WITH REDUCED RESUME TIME

CROSS-REFERENCES TO RELATED APPLICATIONS

This application relates to and claims priority from Japanese Patent Application Number 2003-010674, filed on Jan. 20, 2003.

BACKGROUND OF THE INVENTION

The present invention relates to an optical disk recording/reproducing apparatus and an optical disk recording/reproducing method and, more particularly, to an optical disk recording/reproducing technique which enables an apparatus to speed up a process of restarting a recording from a position on which a reproduction was once interrupted.

A pregroove having a spiral pattern, which functions as a guide groove, is formed on recordable optical disks such as a CD-R disk. Since the guide groove winds with a deviation in the radial direction of about ±0.03 μm and at a cycle of 54 to 63 μm, an FM wave having a center frequency of 22.05 kHz and a frequency shift of ±1 kHz is detected when the disk is rotated at a constant linear velocity of, for example, 1.3 m/s (hereinafter, the FM wave produced by the wobbling is referred to as "wobble signal"). The wobble signal contains frequency-modulated ATIP (Absolute Time In Pregroove) address information indicating absolute time information of the disk, frequency-modulated recording control information, and so forth. At the time of a recording, information such as the ATIP address information, setting information of recording conditions, and so forth of the optical disk is reproduced from the wobble signal to be used for controlling the drive.

Data-recording on the CD-R disk is performed by: reading out the ATIP address from the pregroove; adding the ATIP address position information to the data which is inputted externally by the use of an encoder; executing EFM (Eight to Fourteen Modulation) modulation processing; and irradiating the optical disk with laser light for recording.

In turn, in the case of an occurrence of a so-called buffer underrun, i.e., when a lack of data to be written on the optical disk comes short during the recording operation of the optical disk because a speed of writing data on the optical disk is faster than that of transferring data from a host computer, the data-writing on the optical disk is interrupted so that a predetermined quantity of data, which is transferred from the host computer, is accumulated in a buffer RAM, and then the data-recording on the optical disk is restarted.

In order to restart the data-writing on the optical disk from the position on which the data-recording was interrupted, speed information of the optical disk and the ATIP address information at the time of the interruption are required. However, in the conventional CLV (Constant Linear Velocity) method where data is recorded at a constant linear velocity, the recording speed is constant in the whole area of from the inner periphery to the outer periphery. A recording speed in the conventional ZCLV (Zone Constant Linear Velocity) recording method is set to be constant in identical zones. Therefore, a parameter of the recording speed (fixed value) has been used as the rotation speed of the optical disk from which the EFM signal is reproduced, the EFM signal being used for detecting information of the position, from which a pickup starts tracing on the optical disk in advance of the restart of recording.

But, due to the increase in the speed of recording data on the optical disk, there has been a shift from the CLV recording methods to the CAV (Constant Angular Velocity) recording method which enables to further reduce the recording time. Since the angular velocity is constant in the CAV recording method, the recording speed changes constantly in accordance with a disk radius; therefore, the conventional method of using the parameter of the fixed value as the optical disk speed setting in reproducing the EFM signal at the time of restarting the data-recording after the buffer underrun protection is no longer usable. Thus, there is a demand for establishing new ways for recognizing the reproduction speed setting of the optical disk.

Japanese Patent Laid-open No. 2002-222561 discloses a method of performing a recording/reproducing operation by switching from the CAV recording to the CLV recording at the time of restarting a recording when the recording has been interrupted in order to avoid the buffer underrun, etc. in the CAV recording.

BRIEF SUMMARY OF THE INVENTION

However, in the above-mentioned method of switching from the CAV recording to the CLV recording at restart, it takes a longer time to stabilize the disk rotation speed at a constant linear velocity state. Further, a time loss is caused in recognizing the reproduction speed of the optical disk and adjusting the parameter between an EFM signal detection and an EFMPLL lock when the EFM signal should be detected and at the same time the reproduction speed of the optical disk is intended to be recognized.

A feature of the present invention is to provide a recording technique which reduces a time loss that would be otherwise caused at the time of restarting a data-recording after a buffer underrun protection even if a recording speed of an optical disk changes as in the CAV recording method.

In the present invention, the EFM signal is reproduced by using reproduction settings suitable for a recording speed obtained by the use of a mechanism to obtain a wobble frequency and an ATIP value and encode cycle detection mechanism in the case of performing a writing interruption, thereby realizing a recording restart with a less time loss. According to the present invention, it is possible to shorten a time to be elapsed from the recording interruption to the recording restart.

In accordance with an aspect of the present invention, an optical disk apparatus comprises an optical pickup configured to irradiate an optical disk with a beam, to receive light reflected from the optical disk, and to convert the reflected light into an electrical signal. A processor includes a reproduction system circuit, a speed information detection circuit, and a position detection circuit. The reproduction system circuit is configured to generate a reproduction signal used in restarting recording of the optical disk after an interruption, based on the electrical signal from the optical pickup and setting values. The speed information detection circuit is configured to detect speed information before or after an interruption of a recording on the optical disk based on the electrical signal from the optical pickup. The position detection unit is configured to detect a recording restart position and a current position of the optical disk. An accessing unit is configured to control the optical pickup to access the optical disk at the recording restart position from the current position of the optical disk. A setting unit is configured to set in the reproduction system circuit setting values based on the detected speed information, wherein the setting values are used by the reproduction system circuit to generate the reproduction signal.

In some embodiments, the speed information detection circuit comprises a wobble signal detection circuit for detecting a wobble signal and a wobble cycle detection circuit for measuring a carrier frequency of the detected wobble signal. Alternatively, the speed information detection circuit comprises a wobble signal detection circuit for detecting a wobble signal and an ATIP cycle detection circuit for detecting a cycle in which ATIP address information is obtained from the detected wobble signal. Alternatively, the speed information detection circuit comprises a recording synchronizing clock generation circuit for generating a clock corresponding to a recording speed and a clock cycle detection circuit for detecting a cycle of the recording synchronizing clock generated by the recording synchronizing clock generation circuit.

According to another aspect of the present invention, an optical disk recording method comprises interrupting a recording on an optical disk in response to a recording interruption request; detecting a recording speed set before or after interrupting the recording; setting one or more parameters for a predetermined circuit based on the detected recording speed; detecting position information for accessing a sector before a recording interrupted position; accessing the sector before the recording interrupted position; detecting the recording interrupted position; and restarting recording from the recording interrupted position based on the one or more parameters set for the predetermined circuit.

DETAILED DESCRIPTION OF THE PREFERRED EMBODIMENTS

Preferred embodiments of the present invention will hereinafter be described with reference to the accompanying drawings.

Figure 1:
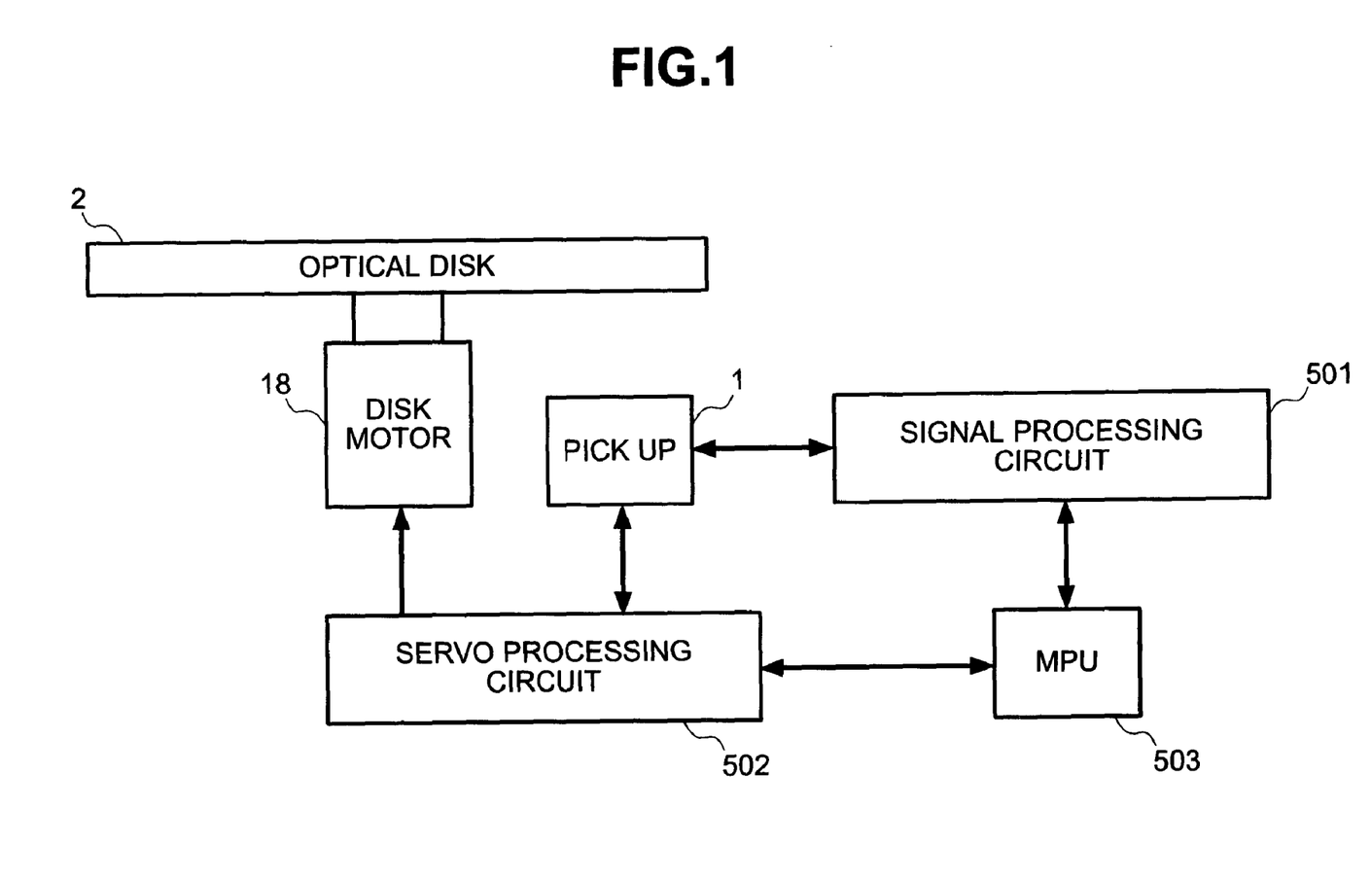
FIG. 1 is a simplified block diagram illustrating one embodiment of an optical disk recording/reproducing apparatus according to the present invention.

As shown in the simplified block diagram of FIG. 1, one embodiment of an optical disk recording/reproducing apparatus includes an optical pickup 1 which irradiates an optical disk with a laser beam, and receives light reflected from an optical disk 2 to the optical pickup 1 by using an integrated laser light source and converts the reflected light into an electric signal by using an integrated light receiving element. Rotation of the optical disk 2 is controlled by driving a disk motor 18 by the use of a rotation cycle control signal which is sent from a microprocessor unit (MPU) 503 through a servo processing circuit 502. The servo processing circuit 502 detects a focus error signal and a tracking error signal from the electric signal sent from the light receiving element included in the optical pickup 1 to perform focusing and tracking following operations of the optical pickup 1, so that the optical pickup 1 follows a desired position of the optical disk 2.

Figure 2:
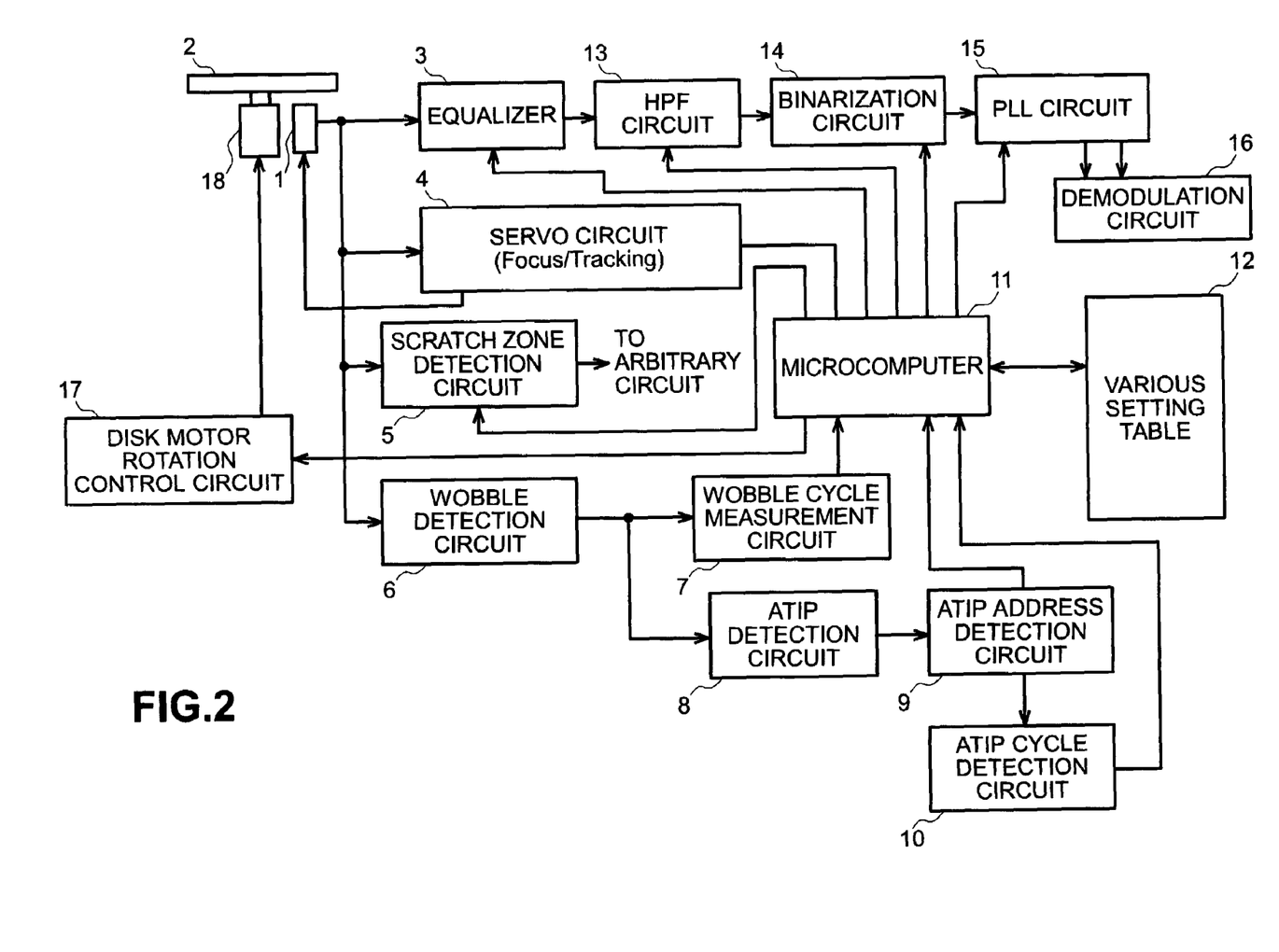
FIG. 2 is a block diagram showing another embodiment of an optical disk recording/reproducing apparatus according to the present invention.
Figure 5:
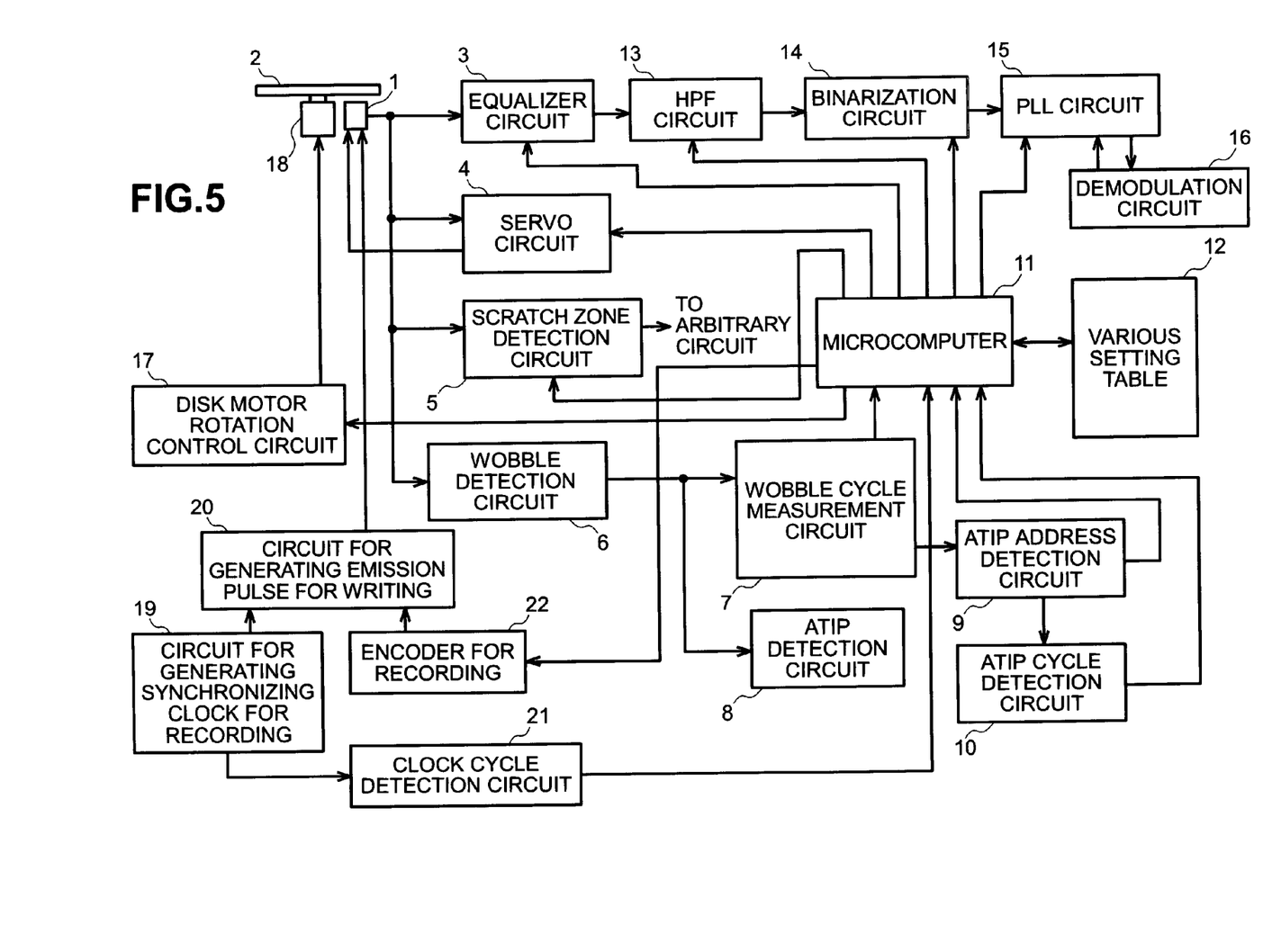
FIG. 5 is a block diagram showing another embodiment of an optical disk recording/reproducing apparatus according to the present invention.

In an exemplary embodiment, the signal processing circuit 501 includes a reproduction system circuit, a recording system circuit, a speed information detection circuit, and a position detection unit. The reproduction system circuit provides a reproduction signal sent from the optical pickup. In one embodiment, the reproduction system circuit includes the following components as illustrated in FIG. 2: equalizer 3, HPF circuit 13, binarization circuit 14, PLL circuit 15, demodulation circuit 16, servo circuit 4, scratch zone detection circuit 5, and disk motor rotation control circuit 17. The recording system circuit controls the laser beam to be irradiated on the optical disk 2 to perform a recording on the disk 2. In the embodiment of FIG. 5, the recording system circuit includes the circuit for generating emission pulse for writing 20 and the encode for recording 22. The speed information detection circuit detects speed information before or after an interruption of the recording on the optical disk 2. In the embodiment shown in FIG. 2, the speed information detection circuit may include different combinations of some of the wobble detection circuit 6, wobble cycle measurement circuit 7, and ATIP cycle detection circuit 10. For instance, the speed information detection circuit may include the wobble signal detection circuit 6 which detects a wobble signal and the wobble cycle measurement circuit 7 which measures a carrier frequency of the detected wobble signal; or may include the wobble signal detection circuit 6 and the ATIP cycle detection circuit 10 that detects from the detected wobble signal a cycle from which ATIP address information is obtained. In another embodiment as seen in FIG. 5, the speed information detection circuit may include the recording synchronizing clock generation circuit 19 which generates a recording synchronizing clock in response to a recording speed, and the clock cycle detection circuit 21 which detects a cycle of the recording synchronizing clock generated by the recording synchronizing clock generation circuit 19. The position detection unit detects a current position of the optical disk 2 which is used for accessing a sector before a position of the recording interruption. The position detection unit may include the ATIP detection circuit 8 and the ATIP address detection circuit 9 in FIG. 2. In addition, the signal processing circuit may include a recording restart position detection circuit which detects or determines a recording restart position from the reproduction signal.

The servo processing circuit 502 includes an accessing unit for accessing the sector before the interrupted position from the current position by controlling the position of the optical pickup 1, and a disc motor control circuit for controlling the disk motor 18 to rotate the optical disk 2.

The MPU 503 of FIG. 1 includes a microcomputer which controls the signal processing unit 501 and the servo processing unit 502 with a memory of various setting table unit for setting in the reproduction system circuit of the signal processing unit 501 setting values based on the detected speed information. In FIG. 2, the MPU 503 includes the microcomputer 11 and the various setting table 12.

For recording, a synchronizing clock is generated. Various methods can be used to generate the synchronizing clock. FIG. 5 shows a circuit 19 for generating the synchronizing clock. In FIG. 1, the MPU 503 may be used to generate the synchronizing clock in different ways. In one example, the MPU 503 detects the reproducing speed from the wobble signal. The MPU 503 controls the oscillation frequency of an oscillator included in a circuit for generating synchronizing clock for recording (e.g., circuit 19) by reproducing the speed from the carrier frequency of the wobble signal. Then, the oscillator can generate the synchronizing clock for recording based on the real recording speed. In another example, the MPU 503 determines the reproduction speed information based on the sector ID information included in the ATIP information from the wobble signal, the disc rotation speed information, the track pitch information, and the linear velocity information of the optical disk 2. The MPU 503 then controls the oscillation frequency of a circuit for generating synchronizing clock (e.g., circuit 19) for recording by the reproduction speed information.

FIG. 2 is a block diagram showing another embodiment of an optical disk recording/reproducing apparatus according to the present invention. In FIG. 2, an optical pickup 1 receives light reflected from an optical disk 2 to the optical pickup 1 by using an integrated laser light source and converts the reflected light into an electric signal by using an integrated light receiving element. Rotation of the optical disk 2 is controlled by driving a disk motor 18 by the use of a rotation cycle control signal which is sent from a microcomputer 11 through a disk motor control circuit 17. A servo circuit 4 detects a focus error signal and a tracking error signal from the electric signal sent from the light receiving element included in the optical pickup 1 to perform focusing and tracking following operations of the optical pickup 1, so that the optical pickup follows a desired position of the optical disk 2.

An equalizer circuit 3 extracts an information signal of the optical disk 2 from the electric signal sent from the light receiving element included in the optical pickup 1 so as to perform a waveform equalization and a group delay smoothing of the EFM signal. An HPF circuit 13 suppresses a fluctuation in binary voltage level of the EFM signal when a scratch passes. A binarization circuit 14 serves to binarize the signal sent from the HPF circuit 13. A PLL circuit 15 generates a synchronizing clock from the binarized signal. A demodulation circuit 16 converts information written on the disk into a digital data string by using the binarized signal and the synchronizing clock. A scratch zone detection circuit 5 generates scratch zone information by using the information signal of the optical disk 2 obtained by the optical pickup 1.

A wobble detection circuit 6 extracts a wobble signal by using the information signal of the optical disk 2 which was obtained by the optical pickup 1. A wobble cycle measurement circuit 7 measures a cycle of a carrier frequency of the extracted wobble signal.

An ATIP detection circuit 8 obtains digital data containing ATIP position information. An ATIP address detection circuit 9 obtains information of a position on the disk from the digital data containing the ATIP position information. An ATIP cycle detection circuit 10 obtains a cycle at which the ATIP information is detected.

The microcomputer 11 directly reads information sent from the wobble cycle detection circuit 7 or the ATIP cycle detection circuit 10 or averages the information sent in a certain period of time to obtain a speed of reading out data from the optical disk 2. The microcomputer 11 also obtains information on the reading out speed based on the disk position information which is sent from the ATIP address detection circuit 9 and on the target information of controlled rotation of the disk motor 18 which is controlled by the microcomputer 11. The microcomputer 11 obtains setting values which are in conformity with the information on the reading out speed by using a predetermined various settings table 12. The microcomputer 11 sends the setting values to all or any of the equalizer circuit 3, the HPF circuit 13, the binarization circuit 14, the PLL circuit 15, the servo circuit 4, and the scratch zone detection circuit 5 to control the circuit(s). More specifically, the microcomputer 11 controls all or any of a boost amount, a cut off frequency, and a group delay characteristic of the equalizer circuit 3. Further, the microcomputer 11 controls all or any of a cut off frequency of the HPF circuit 13, charge and discharge characteristics at a comparison level of the binarization circuit 14, a response characteristic of the PLL circuit 15, a center frequency of an internal VCO, and an automatic free-running frequency before phase-lock; a response characteristic of the servo circuit 4; and an electrical retention characteristic and an envelope detection characteristic at a scratch zone judgment level of the scratch zone detection circuit 5.

The microcomputer 11 also controls all or any of the boost amount, the cut off frequency, and the group delay characteristic of the equalizer circuit 3 and controls the electrical retention characteristic and the envelope detection characteristic at a scratch zone judgment level of the scratch zone detection circuit 5.

A first embodiment of a control method which is employed for a restart of a recording after the recording has been interrupted due to the buffer underrun protection function will hereinafter be described.

Figure 3:
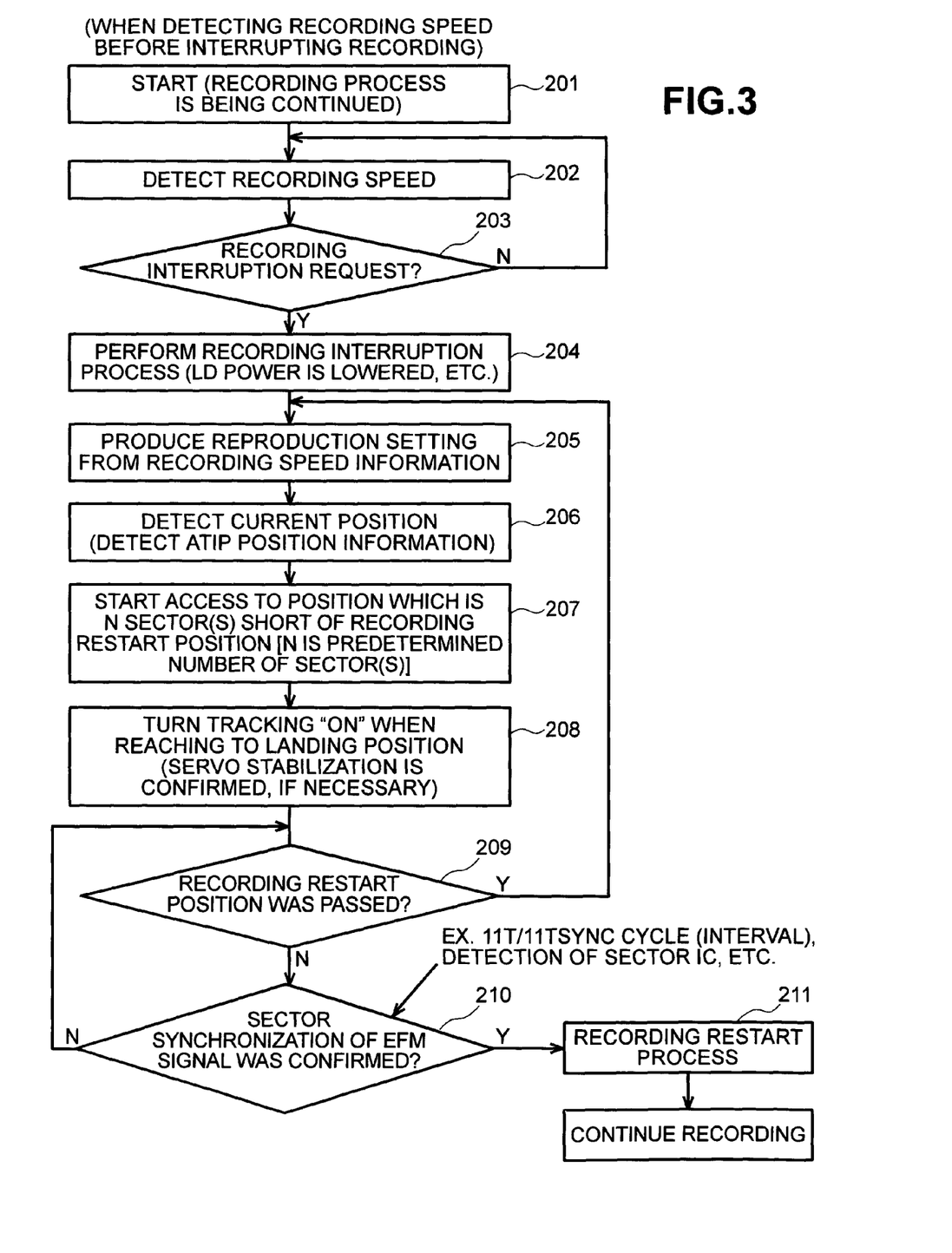
FIG. 3 is a flowchart showing one embodiment of a process operation for interrupting a recording and restarting writing.

FIG. 3 is a flowchart showing a first embodiment of a process operation for interrupting a recording and then restarting writing, wherein a recording speed is detected before the recording interruption. As shown in FIG. 3, a recording process (writing process) is being continued in Step 201. In Step 202, the recording speed information from the wobble cycle detection circuit 7 or the ATIP cycle detection circuit 10 is held in a memory of the microcomputer 11. Alternatively, as shown in FIG. 5 which will be referred to later in this specification, an encode clock is generated and a clock cycle of the encode clock generated is detected to thereby obtain speed information. The thus-obtained speed information is inputted to the microcomputer 11. In Step 203, it is confirmed if there is a request for interrupting the recording. If there is no interruption request (in the case of "N"), the processing returns to Step 202, while the processing proceeds to Step 204 if there is the interruption request (in the case of "Y"). In Step 204, a recording interruption process including lowering laser power of the optical pickup 1 to a level required for read is performed based on the recording interruption request. In Step 205, the recording speed information which has been set in the memory of the microcomputer 11 before the interruption request is read out, and setting values associated with the reading out speed are obtained by using the various settings table 12 to control the frequency characteristics of the equalizer circuit 3 and the HPF circuit 13, the response characteristic of the binarization circuit 14, gains of the PLL circuit 15 and the servo circuit 4, and a time constant of the scratch zone detection circuit 5.

In Step 206, current disk position information is obtained from the ATIP address detection circuit 9. In Step 207, the optical pickup 1 accesses to a position which is a predetermined number of sectors short of a recording restart position, for example, a position which is N sectors short of the recording restart position. In Step 208, it is confirmed that the tracking is "ON" at an optical disk landing position of the optical pickup 1. At the same time, a process of generating a synchronizing clock of the EFM signal by the use of the PLL circuit 15 is started. In Step 209, it is confirmed if the recording restart position on the optical disk 2 has been passed or not. If it is confirmed that the recording restart position has been passed, the processing returns to Step 205. If it is confirmed that the recording restart position has not been passed yet in Step 209, the processing proceeds to Step 210. In Step 210, it is confirmed if a synchronization of the EFM signal has been attained by, for example, detecting a 11T/11TSYNC cycle and a sector ID. If it is confirmed that the synchronization has not been attained yet in Step 210, the processing returns to Step 209. If it is confirmed that the synchronization has been attained in Step 210, the processing proceeds to Step 211 to restart the recording. In the recording restart process of Step 211, the laser power is increased to the recordable level upon estimating the recording interrupted position from a reproduction EFM signal in order to restart the recording.

According to the first embodiment of recording speed determination, since a position to be accessed for restarting the recording after the recording interruption is the predetermined sectors short of the recording interrupted position, i.e., in the vicinity of the interrupted position although it is present before the interrupted position, the recording/reproducing speed therefore is almost the same as that for the recording interrupted position. According to the present embodiment, under the microcomputer control which takes advantage of the fact that the recording/reproducing speed at the access position is almost the same as that for the recording interrupted position, the settings for the reproduction are obtained by designating the recording speed information which has been set in the memory of the microcomputer 11 immediately before the recording interruption as the reproduction speed at the time of the access of the optical pickup 1 for the recording restart. Thus, it is possible to achieve the lock state of the PLL of the EFM system in a short time.

Further, if a scheme of not performing the cycle detection during the access but using a plurality of averaged values for the cycle detection is established in the wobble cycle detection circuit 7 by taking advantage of the fact that both of an access start position for the recording restart and an access termination position are in the vicinity of the recording interrupted position and that the recording/reproducing speeds thereof are almost equal to each other, it is possible to consider that the first information of wobble cycle after access termination is nearly same as the wobble cycle which is detected at near the recording interrupted position. If the speed information of wobble cycle soon after access termination is obtained and reproducing parameters based on the speed information is set, it is possible to achieve the lock state of PLL of the EFM system in a short time.

Alternatively, it is possible to perform the operations in such an order of: produce reproduction setting from recording speed information 205 between in step 202 and in step 203 of FIG. 3; if recording interruption command is outputted in the step of recording interruption request 203 of FIG. 3, the next process is in step 204 of FIG. 3; and then the step 206 of FIG. 3 is executed. This process can always renew all settings for reproduction system depended on recording speed. An advantage of this process is that no need to insert special process (step 205) after interruption request.

A second embodiment of the recording speed determination will hereinafter be described. In the present embodiment, a recording speed detection is performed at a timing when it is found that a recording must be stopped or a timing which is a predetermined number of sectors (or a predetermined quantity of data) short of a recording termination time point. The recording speed information sent via the wobble cycle detection circuit 7, the ATIP cycle detection circuit 10 or a clock cycle detection circuit 21 (see FIG. 5) is held in the memory of the microcomputer 11. That is, in the present embodiment, Step 202 and Step 203 of the flowchart of FIG. 3 are replaced with each other. In this case, after a recording interruption command is outputted in the step of recording interruption request, the speed information stored in the microcomputer 11 is obtained in the step of recording speed detection.

The position of detecting the recording speed is in the vicinity of the recording termination and it can be judged that the recording speed is substantially the same as a reproduction speed. Thus, it is possible to set parameter for EFM reproduction system based on the speed information from wobble cycle which is detected before recording interruption. Of course, the recording speed information may be obtained from the ATIP cycle detection circuit 10 or the clock cycle detection circuit 21 (see FIG. 5) for encoding.

The settings for the reproduction system, for example, based on the wobble cycle, may be obtained at an arbitrary timing from the detection of the wobble cycle to the recording restart; however, the setting for the reproduction system must not extend beyond the recording restart timing. The settings in the various setting table 12, for example, the settings in Step 205 of FIG. 3, may be created at the same time or one by one, or, some of the settings may be created at the same time and others may be established one by one.

A third embodiment of the recording speed determination will hereinafter be described. In this embodiment, a recording speed detection is performed at an arbitrary timing before the optical pickup 1 starts accessing the optical disk 2 for restarting a recording after a recording interruption and then the recording speed information sent from the wobble cycle detection circuit 7, the ATIP cycle detection circuit 10, or the clock cycle detection circuit for encoding 21 (see FIG. 5) is held in the memory of the microcomputer 11. Settings in the various settings table 12, for example, settings in Step 205 of FIG. 3, are applied before reaching to the recording restart position. Alternatively, it is possible to perform the operations in such an order of: performing the recording speed detection of Step 202 and the current position detection of Step 206 simultaneously; obtaining settings for reproduction from the recording speed information Step 205); and performing the steps after Step 207.

A fourth embodiment of the recording speed determination will hereinafter be described with reference to FIG. 4. In the present embodiment, a recording speed detection is performed at a timing when the optical pickup 1 lands on an arbitrary position before a recording restart position on the optical disk 2 for restarting the recording and then the recoding speed information sent from the wobble cycle detection circuit 7, the ATIP cycle detection circuit 10, or the clock cycle detection circuit for encoding 21 (see FIG. 5) is held in the memory of the microcomputer 11.

Figure 4:
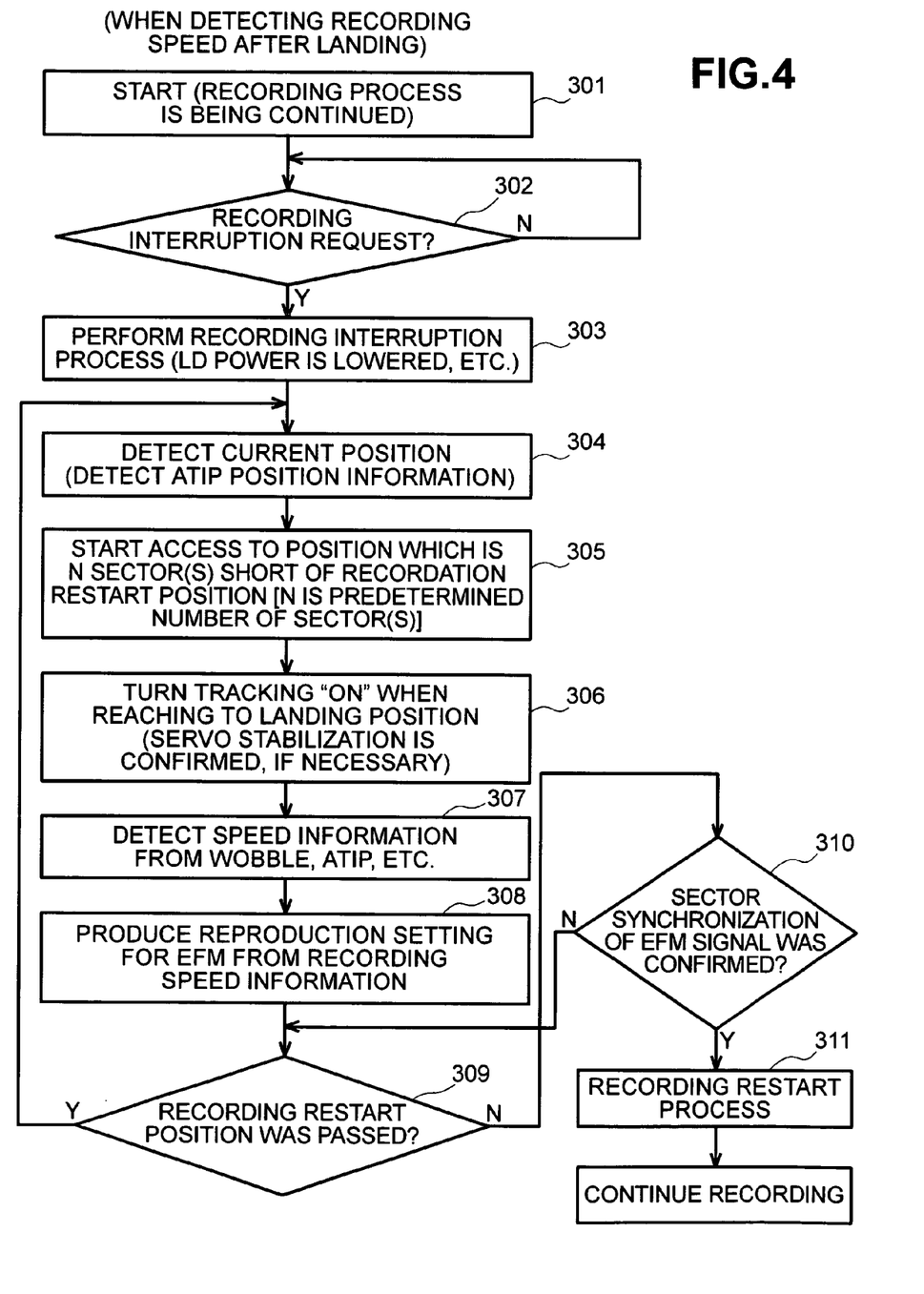
FIG. 4 is a flowchart showing another embodiment of a process operation for interrupting a recording and restarting writing.

FIG. 4 is a flowchart showing another embodiment of a process operation for interrupting a recording and then restarting the recording, wherein the recording speed is detected after a landing for access. A recording is being performed in Step 301. In Step 302, it is confirmed if there is a recording interruption request. If there is no interruption request, the processing returns to Step 302, while the operation proceeds to Step 303 if there is the interruption request. In Step 303, a recording interruption process including lowering laser power of the optical pickup 1 to a level required for read is performed based on the recording interruption request. In Step 304, current disk position information is obtained from the ATIP address detection circuit 9. In Step 305, the optical pickup 1 accesses to a sector position which is N sector(s) before a recording restart position. In Step 306, tracking is switched "ON" at the position on which the optical pickup 1 has landed. When the tracking is switched "ON", a wobble PLL is restarted. In Step 307, the recording speed information sent from the wobble cycle detection circuit 7, the ATIP cycle detection circuit 10, or the clock cycle detection circuit for encoding 21 (see FIG. 5) is held in the memory of the microcomputer 11. It is desirable to obtain the recording speed information after confirming the wobble PLL synchronization in view of the higher reliability of the thus-obtained recording speed information.

In Step 308, setting values associated with a reading out speed (a speed obtained from the recording speed information) are obtained by using the various settings table 12 to control the equalizer circuit 3, the HPF circuit 13, the binarization circuit 14, the PLL circuit 15, the servo circuit 4, and the scratch zone detection circuit 5 in the manner described with reference to FIG. 2. The restart of the wobble PLL must be performed before the optical pickup 1 passes the recording restart position. In this case, with the single use of the EFM system, the reproduction speed is not detected until extracting a reproduction speed component from EFM after the access. In order to extract the reproduction speed component from EFM, for example, a SYNC pattern interval of 11T/11T may be examined; however, an instantaneous detection of the reproduction speed is impossible because a certain degree of averaging is required for not being deceived by a scratch or the like.

In turn, if the wobble PLL frequency holding process during the access has been performed, PLL is set in the lock state immediately after the landing for access. Therefore, it is possible to rapidly detect the speed simply by detecting a synchronizing clock cycle or the like in the wobble PLL lock state, and such rapid detection is advantageous for reducing the time it takes to restart the recording.

Further, a scheme of not performing the cycle detection during the access but using a plurality of averaged values for the cycle detection is established in the wobble cycle detection circuit 7 by taking advantage of the fact that both of an access start position for the recording restart and an access termination position are in the vicinity of the recording interrupted position and the recording/reproducing speeds thereof are substantially equal to each other. This permits to rapidly optimize the speed settings for the reproduction system by using the wobble cycle which is detected firstly after the access for setting the reproduction speed of the access termination position.

Settings for reproducing EFM are obtained in Step 308 to reproduce the EFM signal, and it is judged if the recording position has been passed in Step 309. If it is judged that the recording position has been passed, the processing returns to Step 304. If it is judged that the recording restart position has not been passed yet, it is judged if the EFM signal synchronization has been confirmed or not in Step 310. If it is judged that the EFM signal synchronization has not been confirmed in Step 310, the processing returns to Step 309. If it is judged that the EFM signal synchronization has been confirmed in Step 310, recording is restarted in Step 311.

A process of obtaining the recording speed information at the time of the recording interruption by the use of a recording synchronizing clock will hereinafter be described with reference to FIG. 5.

FIG. 5 is a block diagram showing another embodiment of the optical disk recording/reproducing apparatus according to the present invention. Among components shown in FIG. 5, those which appear also on FIG. 2 are referred to by the same reference numerals, and explanations for them are omitted. Referring to FIG. 5, the encoder for recording 18 converts data to be recorded, for example, a data string sent from a host computer (not shown), into data having a format which can be recorded on the disk 2. The recording encoder 22 is operated at an encoding speed which is faster than a desired recording speed. A circuit for generating synchronizing clock for recording 19 generates a clock which is in accordance with the writing speed. A circuit for generating emission pulse for writing 20 converts, at a recording speed defined by a clock of the circuit 19, the recording signal sent from the recording encoder 22 into a timing signal for controlling laser power switching (timing control signal for emission pulse for writing) of the optical pickup 1. The optical pickup 1, which receives the laser power switching control timing signal from the recording emission pulse generation circuit 20, performs writing operation (laser power switching control) in accordance with the timing signal. The clock cycle detection circuit 21 detects a cycle of the recording synchronizing clock which is generated by the recording synchronizing clock generation circuit 19. The cycle detected by the clock cycle detection circuit 21 is the very recording speed cycle, and the microcomputer 11 monitors the clock cycle (recording speed cycle) to detect the gradually varying recording speed. The timing for obtaining the recording synchronizing clock cycle as the recording speed information is the same as that described in the first embodiment or the fourth embodiment.

As described above, according to the present invention, it is possible to realize a fast and reliable operation of PLL synchronization of EFM signal at the access landing position for restarting the recording after the recording interruption, thereby enabling the system to achieve a transfer to a state of awaiting recording restart position in a short time after the landing for access. Therefore, an unnecessary time loss that would be otherwise caused at the time of restarting data recording after the buffer underrun protection, for example, a time loss caused by a multiple of retry accesses which is required when the recording restart position is passed, can be minimized. The present invention is particularly effective in the case where the recording speed of the optical disk changes as in the CAV recording.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. An optical disk apparatus, comprising:
   an optical pickup configured to irradiate an optical disk with a beam, to receive light reflected from the optical disk, and to convert the reflected light into an electrical signal;
   a signal processing component including:
      a reproduction system circuitry configured to generate a reproduction signal used in restarting recording of the optical disk after an interruption, based on the electrical signal from the optical pickup and setting values;

speed information detection circuitry configured to detect speed information before or after an interruption of a recording on the optical disk based on the electrical signal from the optical pickup; and position detection circuitry configured to detect a recording restart position and a current position of the optical disk;

an accessing unit configured to control the optical pickup to access the optical disk at the recording restart position from the current position of the optical disk; and a setting unit configured to set in the reproduction system circuitry setting values based on the detected speed information, the setting values being used by the reproduction system circuitry to generate the reproduction signal, wherein the reproduction system circuitry comprises:

an equalizer circuit configured to extract an information signal of the optical disk from the electrical signal sent from the optical pickup so as to perform a waveform equalization and a group delay smoothing of an EFM signal;

an HPF circuit configured to suppress a fluctuation in binary voltage level of the EFM signal when a scratch passes;

a binarization circuit configured to binarize the signal sent from the HPF circuit; a PLL circuit configured to generate a synchronizing clock from the binarized signal;

a demodulation circuit configured to convert information written on the optical disk into a digital data string by using the binarized signal and the synchronizing clock; and a scratch zone detection circuit configured to generate scratch zone information by using the information signal of the optical disk obtained by the optical pickup, wherein the setting values comprise at least one of frequency characteristics of the equalizer circuit and the HPF circuit, response characteristics of the binarization circuit, gains of the PLL circuit and the servo circuit, or a time constant of the scratch zone detection circuit.

2. The optical disk apparatus according to claim 1 wherein a recording restart speed for restarting recording is the detected speed from the speed information detection circuit.

3. The optical disk apparatus according to claim 1 wherein the recording restart position on the optical disk is the position on which recording occurred before the interruption at an interrupted position on the optical disk.

4. The optical disk apparatus according to claim 1, wherein the speed information detection circuit comprises a wobble signal detection circuit configured to detect a wobble signal and a wobble cycle measurement circuit configured to measure a carrier frequency of the detected wobble signal.

5. The optical disk apparatus according to claim 1, wherein the speed information detection circuit comprises a wobble signal detection circuit configured to detect a wobble signal and an ATIP cycle detection circuit configured to detect from the detected wobble signal a cycle from which ATIP address information is obtained.

6. The optical disk apparatus according to claim 1, wherein the speed information detection circuit comprises a recording synchronizing clock generation circuit configured to generate a recording synchronizing clock in response to a recording speed, and a clock cycle detection circuit configured to detect a cycle of the recording synchronizing clock generated by the recording synchronizing clock generation circuit.

7. The optical disk apparatus according to claim 1, further comprising a memory for storing recording speed information sent from the speed information detection circuit, wherein, if there is a recording interruption request, speed information before the recording interruption request, which is stored in the memory, is read out.

8. The optical disk apparatus according to claim 1, further comprising a memory for storing recording speed information sent from the speed information detection circuit, wherein, if there is a recording interruption request, speed information of a sector which is a predetermined number of sectors short of the recording interruption request is read out from the memory.

9. The optical disk apparatus according to claim 1, wherein the speed information detection circuit detects speed information during a period ranging from after a recording interruption request to when the optical pickup starts accessing the sector before the interrupted position.

10. The optical disk apparatus according to claim 1, wherein the speed information detection circuit detects speed information after the optical pickup accesses to and lands on the sector before the interrupted position subsequent to a recording interruption request.

11. The optical disk apparatus according to claim 1, wherein the speed information detection circuit comprises a wobble detection circuit configured to extract a wobble signal, and a wobble cycle detection circuit configured to measure a carrier frequency of the wobble signal detected by the wobble detection circuit and detect speed information before or after an interruption of the recording on the optical disk; and wherein the position detection unit comprises an ATIP detection circuit configured to detect a current position which is used for accessing a sector before a position of the recording interruption after a recording interruption from ATIP address information indicating absolute time information of the disk based on the wobble signal obtained from the wobble detection circuit.

12. The optical disk apparatus according to claim 11, further comprising a memory for storing recording speed information obtained by one of the wobble cycle detection circuit and the ATIP cycle detection circuit, wherein, if there is a recording interruption request, speed information before the recording interruption request, which is stored in the memory, is read out.

13. The optical disk apparatus according to claim 1, wherein the speed information detection circuit comprises a wobble signal detection circuit configured to detect a wobble signal, and an ATIP cycle detection circuit configured to detect a cycle at which ATIP address information is obtained from the detected wobble signal to detect speed information before or after an interruption of the recording on the optical disk; and wherein the position detection unit comprises an ATIP detection circuit configured to detect a current position which is used for accessing a sector before a position of a recording interruption after the recording interruption from ATIP address information indicating absolute time information of the disk based on the wobble signal obtained from the wobble detection circuit.

* * * * *